No. 824,459. PATENTED JUNE 26, 1906.
L. WERLIIN.
REGENERATING AND PURIFYING OF AMMONIA.
APPLICATION FILED JUNE 29, 1904.
3 SHEETS—SHEET 1.
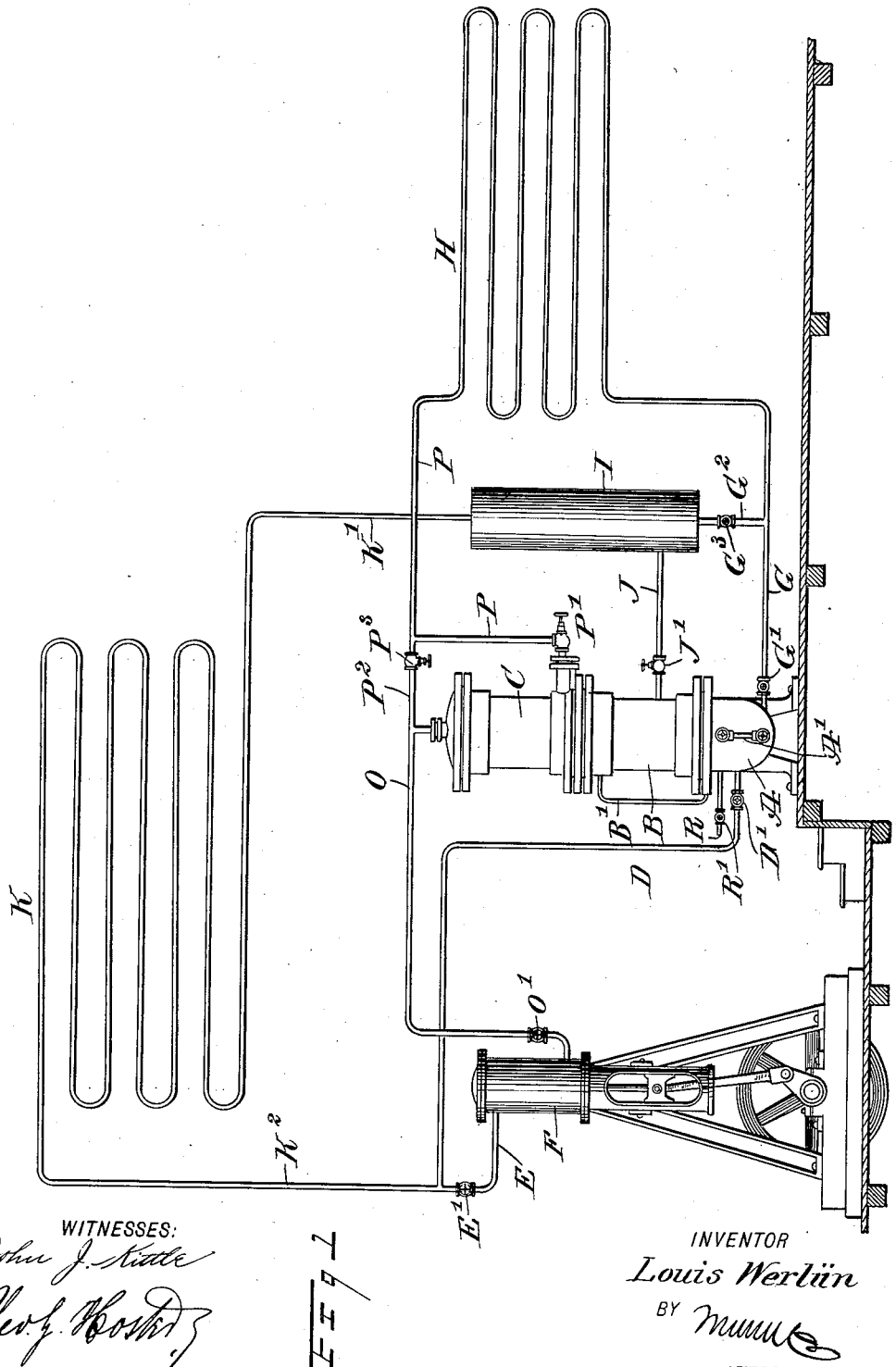
WITNESSES:
INVENTOR
Louis Werliin
BY
ATTORNEYS

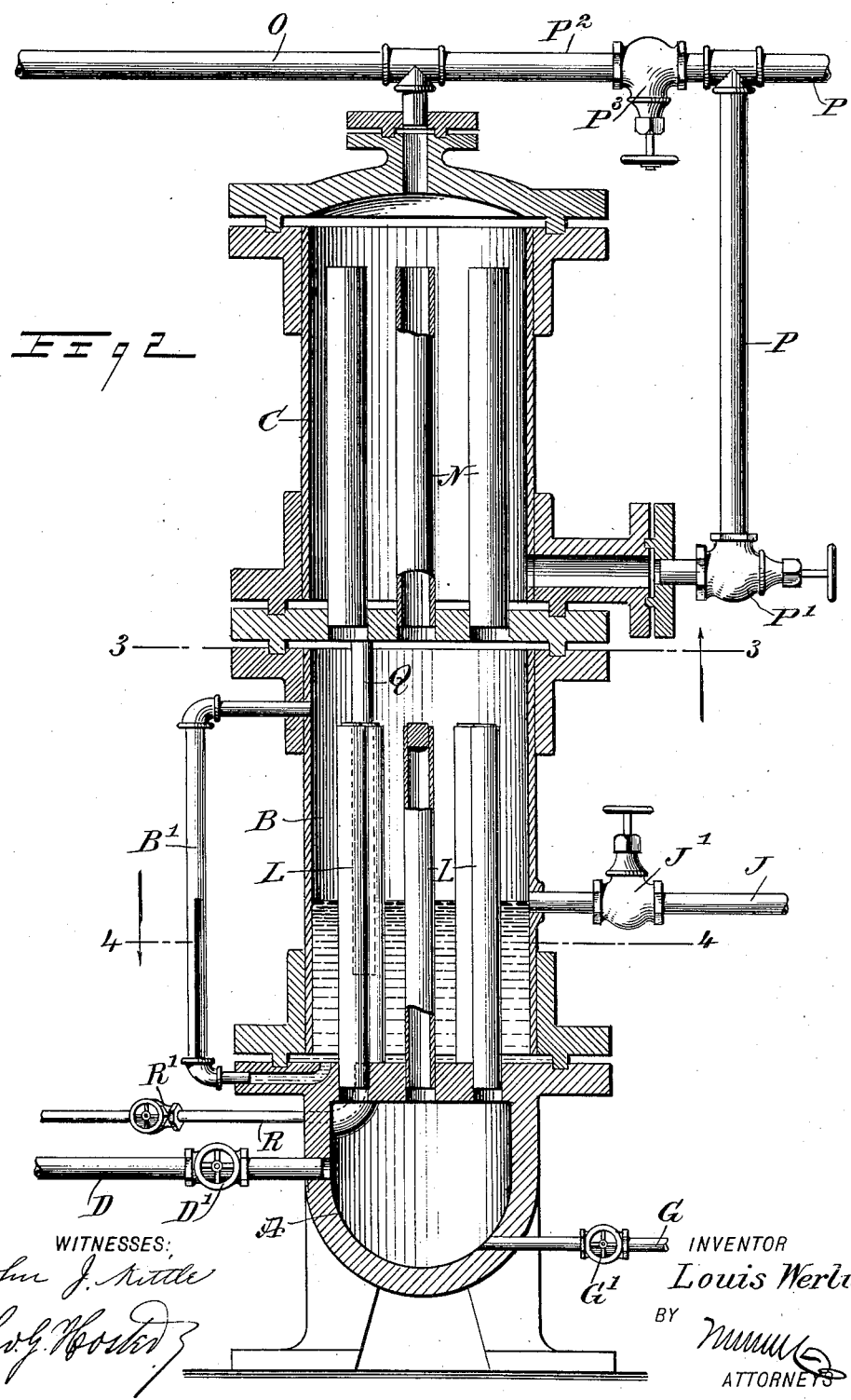

No. 824,459. PATENTED JUNE 26, 1906.
L. WERLIIN.
REGENERATING AND PURIFYING OF AMMONIA.
APPLICATION FILED JUNE 29, 1904.
3 SHEETS—SHEET 3.
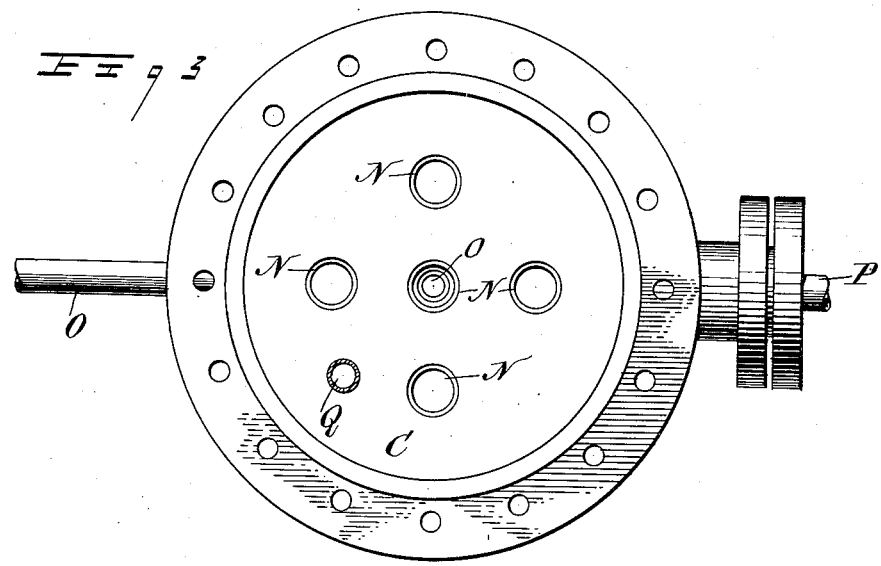
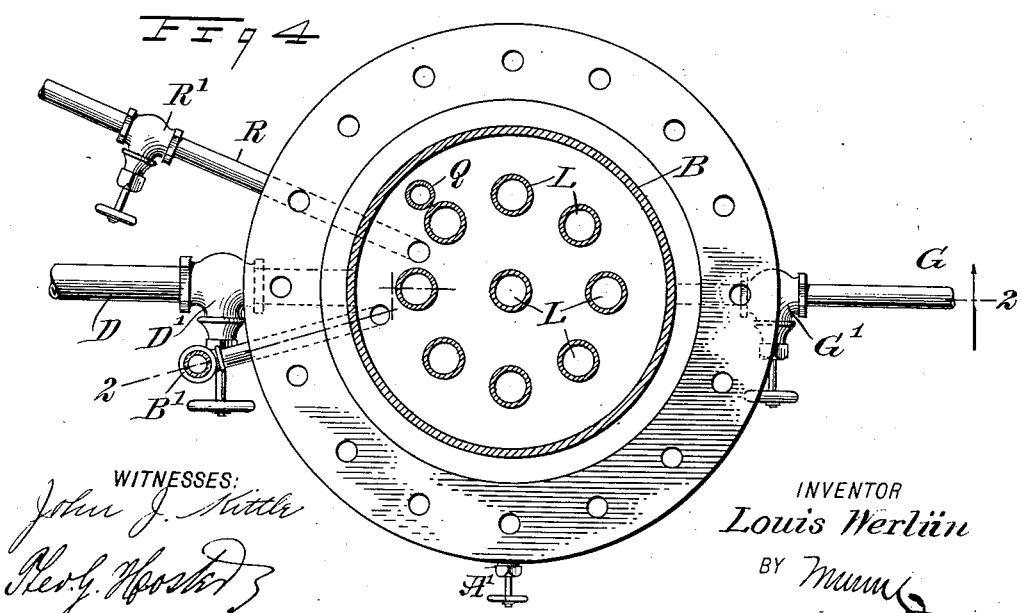

UNITED STATES PATENT OFFICE.

LOUIS WERLIIN, OF ELSMERE, DELAWARE.

REGENERATING AND PURIFYING OF AMMONIA.

No. 824,459.  Specification of Letters Patent.  Patented June 26, 1906.

Application filed June 29, 1904. Serial No. 214,648.

*To all whom it may concern:*

Be it known that I, LOUIS WERLIIN, a citizen of the United States, and a resident of Elsmere, in the county of Newcastle and State of Delaware, have invented new and useful Improvements in the Regenerating and Purifying of Ammonia, of which the following is a full, clear, and exact description.

The invention relates to ice-making and refrigerating machines using liquid anhydrous ammonia; and its object is to provide certain new and useful improvements in the regenerating and purifying of ammonia whereby the reuse of the ammonia is possible at a comparatively small expense and the regenerating and purifying process can be carried on without the use of chemicals and in an exceedingly small apparatus.

The invention consists mainly in a method whereby the warm gases from the high-pressure side of the compression-machine are used for evaporating the liquid anhydrous ammonia and the condensed gases are returned to the receiver or to the expansion-coil.

The invention further consists in a method whereby the cold gases from the expansion-coil are used in the purification and regeneration of the evaporated ammonia.

Reference is to be had to the accompanying drawings, forming a part of this specification, in which similar characters of reference indicate corresponding parts in all the views.

Figure 1 is a side elevation of the apparatus. Fig. 2 is an enlarged sectional side elevation of the regenerator and purifier, the section being on the line 2 2 of Fig. 4. Fig. 3 is an inverted sectional plan view of the same on the line 3 3 of Fig. 2, and Fig. 4 is a sectional plan view of the same on the line 4 4 of Fig. 2.

On top of a condensing-chamber A is arranged an evaporating-chamber B, which in turn supports at its upper end a purifying or separating-chamber C, as plainly illustrated in Figs. 1 and 2. The condensing-chamber A is connected by a pipe D, having a valve D', with a discharge-pipe E, having a valve E' and leading from the high-pressure side of a compression-machine F of any approved construction. The condensing-chamber A is also connected by a pipe G, having a valve G', with one end of an expansion-coil H, and the said pipe G is also connected by a branch pipe $G^2$, having a valve $G^3$, with a receiver I for containing anhydrous liquid ammonia.

The receiver I is connected by a pipe J, having a valve J', with the evaporating-chamber B, so as to keep the latter about two-thirds filled with anhydrous liquid ammonia, the valve J' being so set as to maintain the liquid in the chamber B at a uniform level. The top of the receiver I is connected by a pipe K' with the discharge end of a condenser K, connected at its inlet-pipe $K^2$ with the discharge-pipe E, previously mentioned, and leading from the high-pressure side of the compression-machine F.

In the top of the condensing-chamber A are secured tubes L, closed at their upper ends, extending upward in the chamber B, so as to be surrounded by the liquid ammonia contained in the said chamber B. From the top of the chamber B, which top also forms a bottom for the chamber C, extend tubes N up into the purifying or separating chamber C, the pipes being open at both ends to allow the evaporated ammonia to pass from the chamber B through the tubes N into the chamber C, which latter is connected at its top by a pipe O, having a valve O', with the inlet or suction side of the compression-machine F. A pipe P, provided with a valve P', connects the lower end of the purifying or separating chamber C with the discharge end of the expansion-coil H, and the said pipe P is also connected by a branch pipe $P^2$, having a valve $P^3$, with the pipe O, so as to allow the cold gases from the expansion-coil H to pass either by the pipe P and valve P' into the lower end of the purifying or separating chamber C, or in case the valve P' is closed and the valve $P^3$ open to allow the said cold gases from the expansion-coil H to pass directly into the pipe O and to the suction end of the compression-machine F. Normally, however, the valve $P^3$ is closed and the valve P' is open.

From the bottom of the purifying and separating chamber C leads a drain-pipe Q into the lower end of the evaporating-chamber B, so that the impurities will be condensed in the chamber C and flow from the latter back into the evaporating-chamber B. From the bottom of the latter chamber leads a blow-off pipe R, having a valve R', and the said chamber B is provided with a glass gage B' to indicate the amount of liquid anhydrous ammonia contained in the said chamber. A similar glass gage A' is arranged on the condensing-chamber A to indicate the amount of condensed ammonia contained therein.

The operation is as follows: When the compression-machine is running and the valves E', O', P', D', G', and J' are open and the valves G³, P³, and R' are closed, then a portion of the hot gases from the high-pressure side of the compression-machine F passes, by way of the pipes E and D, into the condensing-chamber A and into the tubes L, so that the liquid anhydrous ammonia in the evaporating-chamber B is quickly heated and evaporated, especially as the liquid in the said chamber is under low pressure owing to the connecting of the chamber B by way of the pipes N, chamber C, and pipe O with the suction end of the compression-machine F. By the arrangement described the walls of the tubes L are constantly kept at a low temperature, owing to the continuous evaporation under low pressure of the liquid ammonia surrounding the said tubes L within the chamber B, and consequently the gas readily condenses in the chamber A and passes by way of the pipe G into the expansion-coil H, from which pass the spent or cold gases by way of the pipe P into the lower end of the purifying and separating chamber C. As the cold spent gases pass into the chamber C they come in contact with the tubes N, heated by the gases rising from the chamber B, so that the said spent cold gases are gradually warmed and rise in the chamber C to finally mix with the gases from the chamber B to form regenerated and purified gases which pass by way of the pipe O into the compression-machine F, from which the gases are discharged on the high-pressure side to the pipe E into the pipes D and K². The portion of the warm gases passing through the pipe K² into the condenser K are condensed therein, and the liquid ammonia flows from the condenser back into the receiver I, so that the ammonia is constantly used over and over again. If desired, the valve G³ in the branch pipe G² may be opened, so that the condensed ammonia from the chamber A can return to the receiver I, and, if desired, the valve P' may be closed and the valve P³ opened, so that the cold gases pass directly from the expansion-coil H to the pipe O and the compression-machine F instead of passing through the purifying and separating chamber C, as above described. The gases passing from the expansion-coil into the purifying and separating chamber C have a twofold function in that they keep the tubes N cold, so that any less volatile matter than ammonia contained in the gases rising from the chamber B through the tubes N are condensed and flow back through the tubes N into the chamber B, and any impurities—such as water, oil, and the like—carried along with the spent gases from the expansion-coil H are retained in the lower portion of the chamber C and flow through the drain-pipe Q down into the chamber B, while the dry gases separated from the water, oil, and like impurities, readily rise in the chamber C to mix with the gases from the chamber B, as previously explained. It is to be understood that as long as the anhydrous ammonia in the generator is fairly pure then there is no difference in temperature between the gases coming from the expansion-coil and the gases from the anhydrous ammonia in the generator, and no action takes place; but as the ammonia becomes gradually more contaminated more heat is required for vaporization, and the gases will be warmer in the same proportion, and toward the end of the operation when the impurities are in excess the temperature of the gases may be 40° to 50° above the gases from the expansion-coil, and it is at that stage of the operation that the chamber C is effective, as many impurities less volatile than ammonia would readily pass off with the pure gases, but by passing through the cold tubes N in chamber C will be condensed and returned to B. The refrigerant fluid should pass from the liquid-receiver on the high-pressure side of the compressor to chamber B through valve J'. If the anhydrous ammonia condensed in chamber A is wanted direct in the expansion-coil H, G' will act as an expansion-valve, (it is only a very small portion of the anhydrous ammonia needed in the expansion-coil that will pass that way;) but if it is desired to deliver the anhydrous ammonia to the receiver I instead valve G' will be closed and valve G³ opened, as before described; but in that case the apparatus must be elevated above the receiver. As will be seen, the valve G' is only supposed to act as expansion for the small amount of ammonia that is condensed in the purifier, but has nothing to do with the main system. From the foregoing it will be seen that no chemicals are used for the purification of the ammonia and no additional or external heat is required for evaporation of the liquid in the chamber B. After the operation above described has been continued, say, from one to two weeks the valve J' is closed, and then the evaporation is continued until all the frost in the gage-glass B' has disappeared, and then the valve R' is opened, so as to blow out the residue in the chamber B through the pipe R, after which the valve R' is closed and the valve J' is again opened to permit recharging of the chamber B with liquid anhydrous ammonia.

Although I have described the invention as using ammonia for the refrigerant, it is evident that the invention applies equally well to systems using other refrigerants than the one named.

Having thus described my invention, I claim as new and desire to secure by Letters Patent—

1. The method herein described of purifying the refrigerant gas used in refrigerating-machines, consisting in compressing the gas, condensing one portion, expanding a portion of that condensed to obtain the cooling effect, evaporating the remaining portion of that condensed, by the heat of condensation of the remaining portion of the warm compressed gas, purifying the vapors thus produced, by the action of the cold exhaust gas from the expansion device, mixing the cold exhaust-gas and the purified vapors, and recompressing the same.

2. The method herein described of purifying the refrigerant gas used in the refrigerating-machines, consisting in compressing the gas, condensing a portion of the gas, subjecting the liquid refrigerant to the remaining portion of the compressed gas, to vaporize the same and to condense the compressed gas, expanding a portion of the condensed gas to cool the same, subjecting the gases from the liquid refrigerant to the action of the cold spent gases, whereby the less-volatile impurities of the refrigerant gases will be condensed, mixing the spent gases with the gases from the liquid refrigerant, and compressing the mixed gases.

3. The method herein described of purifying the refrigerant gas used in refrigerating-machines, consisting in subjecting the liquid refrigerant to the action of compressed gas to vaporize the liquid refrigerant and to condense the compressed gas, expanding a portion of the condensed gas to cool the same, subjecting the gases from the liquid refrigerant to the action of the cold spent gases, whereby the less-volatile impurities of the refrigerant gases will be condensed, mixing the spent gases with the liquid refrigerant gases, and compressing the mixed gases.

4. The method herein described of purifying the refrigerant gas used in refrigerating-machines, consisting in vaporizing the liquid refrigerant, condensing compressed gas, expanding a portion of the condensed gas to cool the same, subjecting the gases from the liquid refrigerant to the action of the cold spent gases whereby to condense the less-volatile impurities contained in the refrigerant gases and to separate the liquid matter from the spent gases and free said liquid matter of any ammonia, mixing the purified gases and vapors, and compressing the mixture.

5. The method herein described of purifying the refrigerant gas used in refrigerating-machines, consisting in vaporizing the liquid refrigerant, subjecting the gases from the liquid refrigerant to the action of cold spent gases, whereby to condense the less-volatile impurities contained in the refrigerant gases and to separate the liquid matter from the spent gases and free said liquid matter of ammonia, and mixing the purified gases and the vapors of the liquid refrigerant.

In testimony whereof I have signed my name to this specification in the presence of two subscribing witnesses.

LOUIS WERLIIN.

Witnesses:
 WM. P. MORTON,
 WESTAR M. WEINTRAUB.